United States Patent
Tseng et al.

(10) Patent No.: US 10,409,719 B2
(45) Date of Patent: Sep. 10, 2019

(54) USER CONFIGURABLE PASSIVE BACKGROUND OPERATION

(71) Applicants: Derrick Tseng, Union City, CA (US); Changho Choi, San Jose, CA (US)

(72) Inventors: Derrick Tseng, Union City, CA (US); Changho Choi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 51 days.

(21) Appl. No.: 15/151,470

(22) Filed: May 10, 2016

(65) Prior Publication Data

US 2017/0270042 A1 Sep. 21, 2017

Related U.S. Application Data

(60) Provisional application No. 62/309,954, filed on Mar. 17, 2016.

(51) Int. Cl.
*G06F 12/00* (2006.01)
*G06F 13/00* (2006.01)
*G06F 13/28* (2006.01)
*G06F 12/02* (2006.01)

(52) U.S. Cl.
CPC ...... *G06F 12/0253* (2013.01); *G06F 12/0246* (2013.01); *G06F 12/0261* (2013.01); *G06F 2212/1044* (2013.01); *G06F 2212/2022* (2013.01); *G06F 2212/7205* (2013.01)

(58) Field of Classification Search
CPC ............. G06F 12/0253; G06F 12/0261; G06F 12/0246

USPC ......................................................... 711/103
See application file for complete search history.

(56) References Cited

U.S. PATENT DOCUMENTS

| | | | |
|---|---|---|---|
| 7,743,276 B2 | 6/2010 | Jacobson et al. |
| 8,370,720 B2 | 2/2013 | Allen |
| 8,521,972 B1 | 8/2013 | Boyle et al. |
| 8,713,268 B2 | 4/2014 | Dillow et al. |
| 8,799,561 B2 | 8/2014 | Bux et al. |
| 8,886,691 B2 | 11/2014 | Colgrove et al. |
| 8,898,376 B2 | 11/2014 | Aune |
| 9,158,684 B2 | 10/2015 | Lee et al. |

(Continued)

OTHER PUBLICATIONS

Jones et al., The Garbage Collection Handbook: The Art of Automatic Memory Management, Chapman & Hall (Year: 2011).*

*Primary Examiner* — Charles Rones
*Assistant Examiner* — Sidney Li
(74) *Attorney, Agent, or Firm* — Renaissance IP Law Group LLP

(57) ABSTRACT

A system and method for permitting an SSD (120) to perform passive Garbage Collection is described. The SSD (120) may include storage (315) to store data, and a Garbage Collection logic (340) that may perform Garbage Collection on the storage (315). Reception circuitry (305) may receive a configuration command (405) from a host (105). The configuration command (405) may include a condition (410, 505, 605), such as an idle duration (505) and/or a queue depth threshold (605). A condition storage (325) may store the condition (410, 505, 605). A state determiner (320) may determine a state (510, 610) of the SSD (120). A comparator (330) may compare the state (510, 610) of the SSD (120) with the condition (410, 505, 605) to determine whether to trigger passive Garbage Collection.

29 Claims, 13 Drawing Sheets

(56) References Cited

U.S. PATENT DOCUMENTS

| | | |
|---|---|---|
| 9,223,693 B2 | 12/2015 | Sinclair et al. |
| 2011/0022778 A1* | 1/2011 | Schibilla ............ G06F 12/0246 |
| | | 711/103 |
| 2011/0047356 A2 | 2/2011 | Flynn et al. |
| 2013/0111153 A1 | 5/2013 | Lee |
| 2013/0290601 A1 | 10/2013 | Sablok et al. |
| 2014/0215129 A1 | 7/2014 | Kuzmin et al. |
| 2015/0026514 A1* | 1/2015 | Benhase ............ G06F 11/2066 |
| | | 714/6.23 |
| 2015/0347025 A1 | 12/2015 | Law |
| 2016/0308968 A1* | 10/2016 | Friedman ............ H04L 67/2842 |

* cited by examiner

USER CONFIGURABLE PASSIVE BACKGROUND OPERATION

RELATED APPLICATION DATA

This application claims the benefit of U.S. Provisional Patent Application Ser. No. 62/309,954, filed Mar. 17, 2016, which is incorporated by reference herein for all purposes.

FIELD

The inventive concepts relate generally to Solid State Drives (SSDs), and more particularly to enhancing when SSDs may perform Garbage Collection.

BACKGROUND

Garbage Collection is a common occurrence on Solid State Drives (SSDs). When an SSD runs out of free erase blocks, it performs Garbage Collection (GC) to free up new erase blocks for new writes to use. This process may slow down the read/write performance of the SSD, since the write/read must wait for Garbage Collection to complete before the request may be serviced. Features such as Storage Intelligence help to address this problem with host initiated Garbage Collection. However, this requires that the host issue a Garbage Collection command to notify the device to begin Garbage Collection.

A need remains for a way to improve the performance of large databases and to balance the two objectives of minimizing latency and keeping cost down.

DETAILED DESCRIPTION

Figure 1:
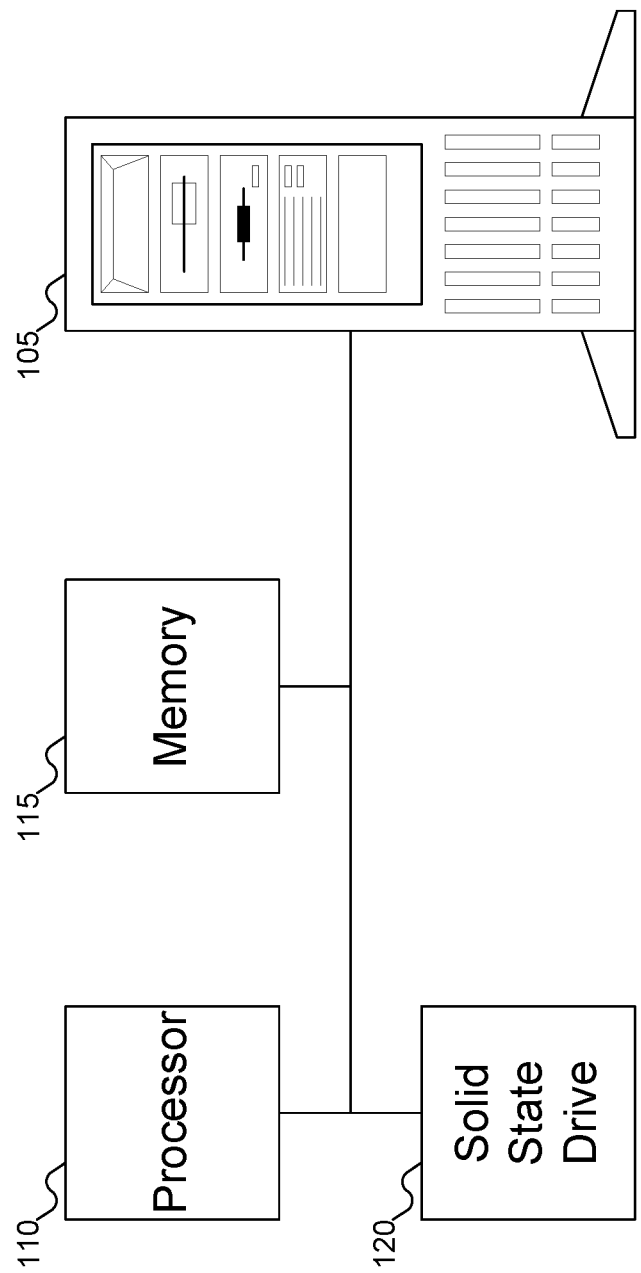
FIG. 1 shows a system including a Solid State Drive (SSD) equipped to perform passive Garbage Collection, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

The efficacy of host-initiated background operations, such as Garbage Collection, may be improved by allowing the device to be configured to automatically start background operations in-between I/O requests when the state of the device has crossed a certain threshold. This feature may be enabled or disabled by the host via command or settings page.

Allowing the device to be configured to automatically start background operations may help hosts see improvements to input/output (I/O) with minimal or no modification to their applications. This feature maximizes the use of Solid State Drive (SSD) idle times that were unexpected by the host application. The host may configure the SSD to automatically start background operations in-between command requests (i.e., idle times).

In one example, the host may configure the SSD device to automatically start background operations when an idle duration reaches a certain time: for example, 50 milliseconds (ms). The SSD may start an idle timer when there are no host commands in the queue and starts background operations when 50 ms has passed.

In another example, the host may configure the SSD device to automatically start background operations when the command queue depth falls below a certain level (e.g. 10 commands). This low queue depth may signify to the device that there is "light" traffic and therefore it may run background operations. This might have an effect on the performance of the current I/O that is being processed, but should not have a significant overall impact of I/O.

The device may be configured using the devices' interface protocol (e.g., Small Computer System Interface (SCSI), Non-Volatile Memory Express (NVMe), AT Attachment (ATA), Serial ATA (SATA), iSCSI, Fiber Channel (FC), Ethernet, etc.). For example, in SCSI, configuration values may be set in Mode Pages to enable passive Garbage Collection and to set the background operation condition settings, in NVMe, these settings may be set in the Features pages, and so on.

FIG. 1 shows a system including a Solid State Drive (SSD) equipped to perform passive Garbage Collection, according to an embodiment of the inventive concept. In FIG. 1, computer 105 may include processor 110, memory 115, and SSD 120. Processor 110 may be any variety of processor: for example, an Intel Xeon, Celeron, Itanium, or Atom processor, or an AMD Opteron processor. Memory 115 may be any variety of memory, such as non-volatile memory (e.g., flash memory) Static Random Access Memory (SRAM), Persistent Random Access Memory (PRAM), etc. but is typically Dynamic Random Access Memory (DRAM). SSD 120 may be any variety of SSD. In addition, SSD 120 may be replaced with any equivalent storage device that may benefit from embodiments of the inventive concept. Computer 105 itself may be replaced with any machine that offers comparable functionality, such as a laptop computer, server, or portable computing device, such as a smartphone, with no loss of generality. For simplicity, computer 105 will be referred to as a "host".

Figure 2:
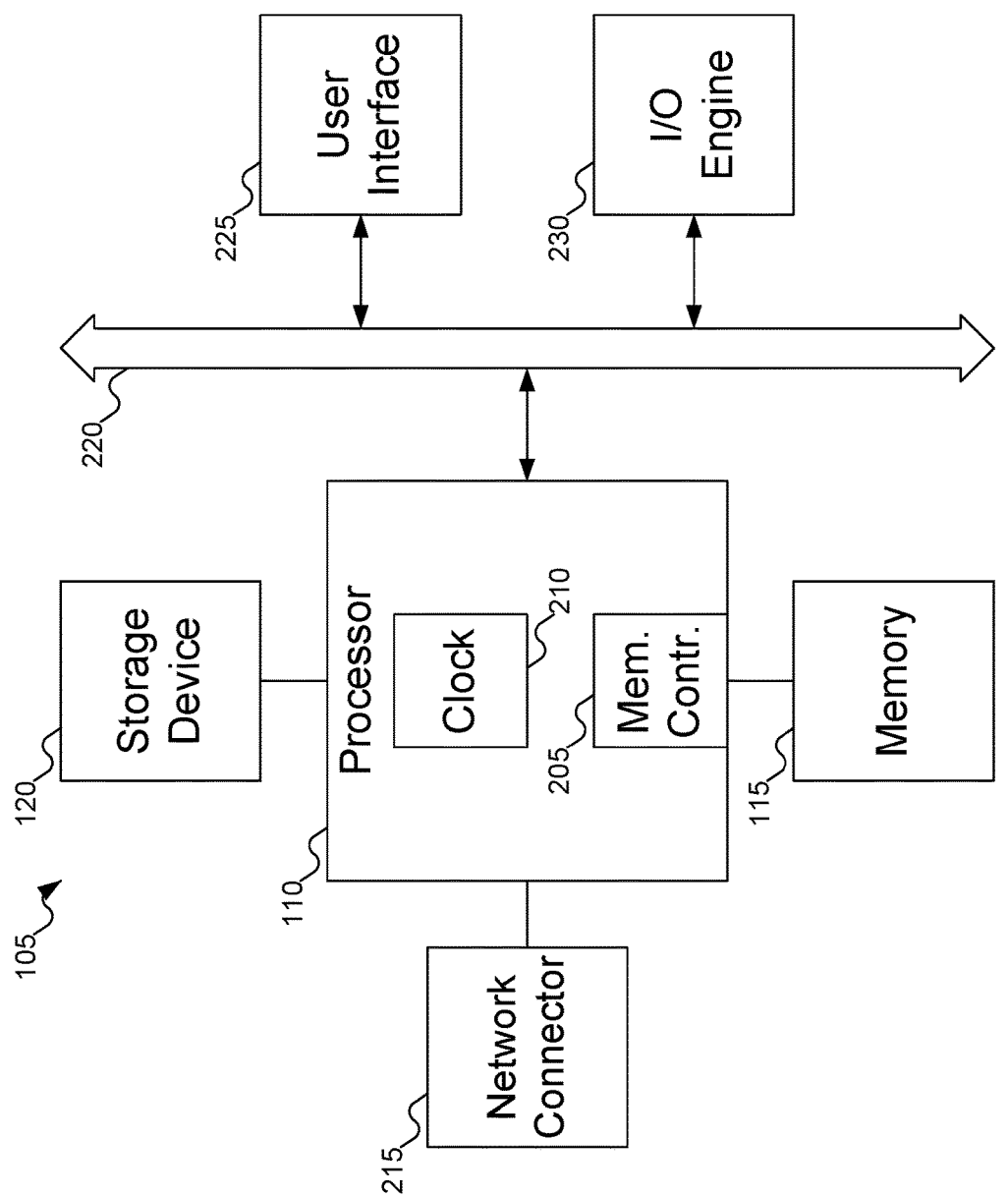
FIG. 2 shows additional details of the computer of FIG. 1.

FIG. 2 shows additional details of host 105 of FIG. 1. Referring to FIG. 2, typically, machine or machines 105 include one or more processors 110, which may include memory controller 205 and clock 210, which may be used to coordinate the operations of the components of machine or machines 105. Processors 110 may also be coupled to memory 115, which may include random access memory (RAM), read-only memory (ROM), or other state preserving media, as examples. Processors 110 may also be coupled to storage devices 120, and to network connector 215, which may be, for example, an Ethernet connector or a wireless connector. Processors 110 may also be connected to a bus 220, to which may be attached user interface 225 and input/output interface ports that may be managed using input/output engine 230, among other components.

Figure 3:
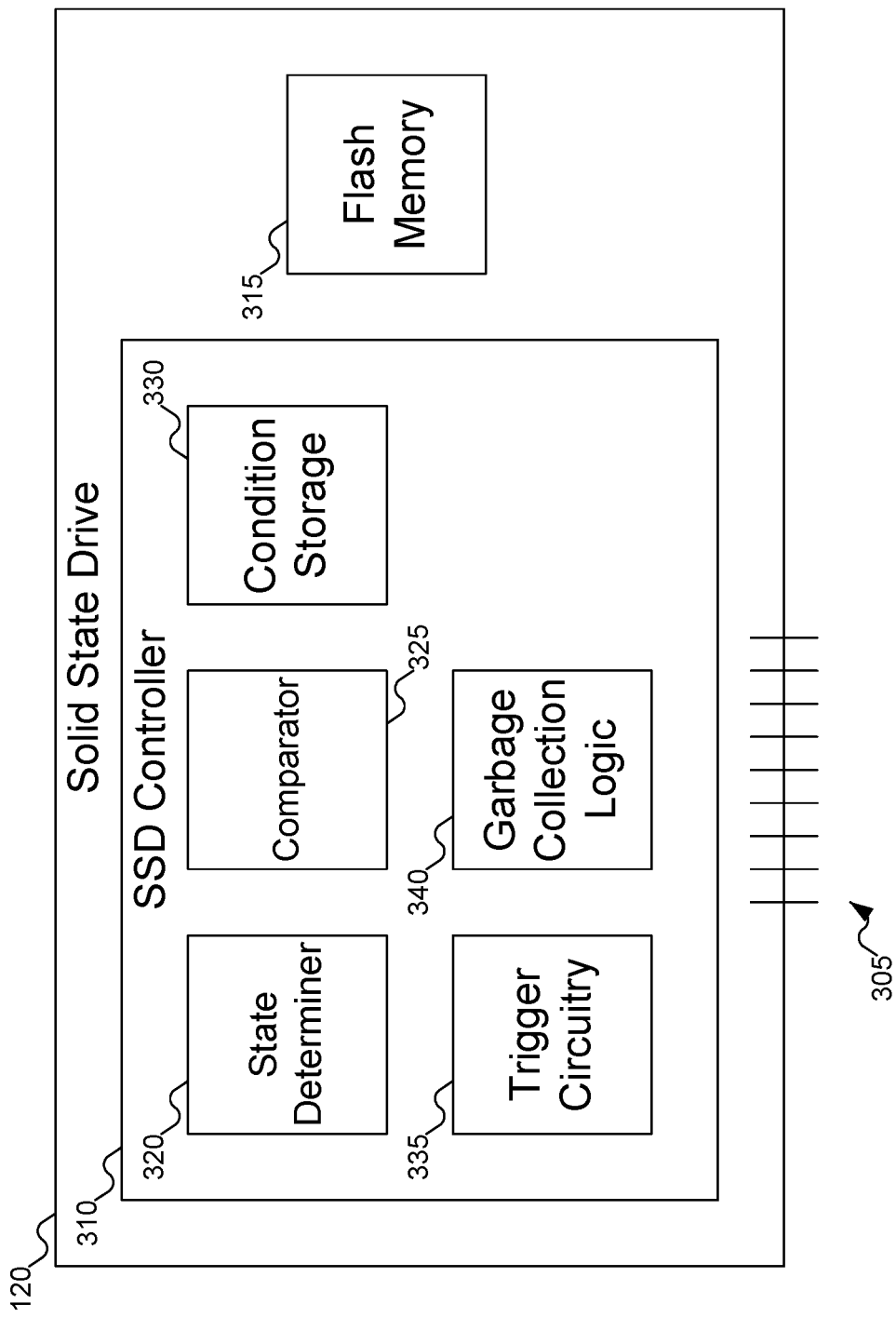
FIG. 3 shows details of the SSD of FIG. 1 equipped to perform passive Garbage Collection.

FIG. 3 shows details of SSD 120 of FIG. 1 equipped to perform passive Garbage Collection. In FIG. 3, SSD 120 may include circuitry 305 that may be used to send and receive information (such as operations or data). SSD 505 may also include SSD controller 310 and flash memory 315. SSD controller 310 may control the operation of SSD 120. Flash memory 315 may store data in blocks that may be subject to Garbage Collection.

SSD controller 310 may include, among other components, state determiner 320, comparator 325, condition storage 330, trigger circuitry 335, and Garbage Collection logic 340. State determiner 320 may determine the state of SSD 120. The "state" of SSD 120 may depend on what condition is specified by host 105 of FIG. 1. As described above, host 105 may specify different conditions, such as an idle duration (i.e., an interval during which SSD 120 is not processing requests from host 105 of FIG. 1 or other hosts) or queue depth (i.e., how many commands are waiting to be processed). Depending on the condition specified by host 105 of FIG. 1, state determiner 320 may determine the appropriate state of SSD 120.

Comparator 325 may compare the state of SSD 120, as determined by state determiner 320, with the condition specified by host 105 of FIG. 1. For example, if host 105 of FIG. 1 specified an idle duration of 50 ms, comparator 325 may compare this idle duration with how long SSD 120 has actually been idle, as determined by state determiner 320. If SSD 120 has been idle for at least 50 ms, then comparator 325 may indicate that the condition is met. Alternatively, if host 105 of FIG. 1 specified a queue depth of 10 commands, comparator 325 may compare this queue depth with how many commands are currently pending for SSD 120. If SSD 120 has no more than 10 commands currently pending, then comparator 325 may indicate that the condition is met.

Condition storage 330 may store locally on SSD 120 the condition used to determine when to perform passive Garbage Collection. For example, if host 105 of FIG. 1 specified an idle duration of 50 ms, condition storage 330 may store 50 ms as the condition. Alternatively, if host 105 of FIG. 1 specified a queue depth of 10 commands, condition storage 330 may store 10 commands as the condition. Comparator 325 may access the condition from condition storage 330.

Conditions may be either singular or compound. For example, host 105 of FIG. 1 may specify a singular condition, such as an idle duration of 50 ms. Then, if SSD 120 is idle for 50 ms, passive Garbage Collection may be triggered. The advantage of performing passive Garbage Collection in this manner is that SSD 120 may do its best, without instruction from host 105 of FIG. 1, to keep as many free erase blocks as possible within flash memory 315. But host 105 of FIG. 1 may also specify a compound condition of an idle duration of 50 ms and fewer than 10,000 free erase blocks. In this manner, even if SSD 120 is idle for a sufficient interval, if SSD 120 has enough free erase blocks SSD 120 will not perform passive Garbage Collection. By not performing passive Garbage Collection, SSD 120 may avoid being unnecessarily busy when another command comes in, which might be delayed while Garbage Collection completes.

When compound conditions are used, they may be combined in any desired manner using conventional logical operators (AND, OR, and NOT) and in any number. For example, host 105 of FIG. 1 might specify a condition of (duration=50 ms) AND (queue depth<=10 commands) AND (free erase blocks<10,000). This combination specifies that, to perform passive Garbage Collection, the queue depth for SSD 120 has to be no greater than 10 commands for a duration of 50 ms; and even then, passive Garbage Collection would be performed only if there are fewer than 10,000 free erase blocks in flash memory 315. Note that in this example, rather than measuring an idle duration (that is, an interval during which SSD 120 is processing no commands), the duration describes an interval during which the overall state of SSD 120 (10 or fewer commands in the queue and fewer than 10,000 free erase blocks) remains unchanged. Using this more generalized concept of duration, an idle duration could be specified using the compound condition (duration=50 ms) AND (queue depth=0).

When the condition is compound, state determiner 320 may determine multiple states for SSD 120. For example, if host 105 of FIG. 1 specifies a condition of (duration=50 ms) AND (free erase blocks<10,000), then state determiner 320 may determine both an idle time and a free erase block count for SSD 120.

Trigger circuitry 335 may receive the result of comparator 325. Trigger circuitry 335 may then send a trigger signal to Garbage Collection logic 340 when the condition is met to perform passive Garbage Collection.

Garbage Collection logic 340 may be a logic to perform Garbage Collection on flash memory 315. Garbage Collection itself is conventional, and need not be further described here.

While FIG. 3 shows state determiner 320, comparator 330, condition storage 330, and trigger circuitry 335 as separate components within SSD controller 310, embodiments of the inventive concept may combine these components into a single unit, or into any desired sub-combinations. FIG. 3 shows these components as separate elements merely to better illustrate the operations involved in performing passive Garbage Collection.

Figure 4:
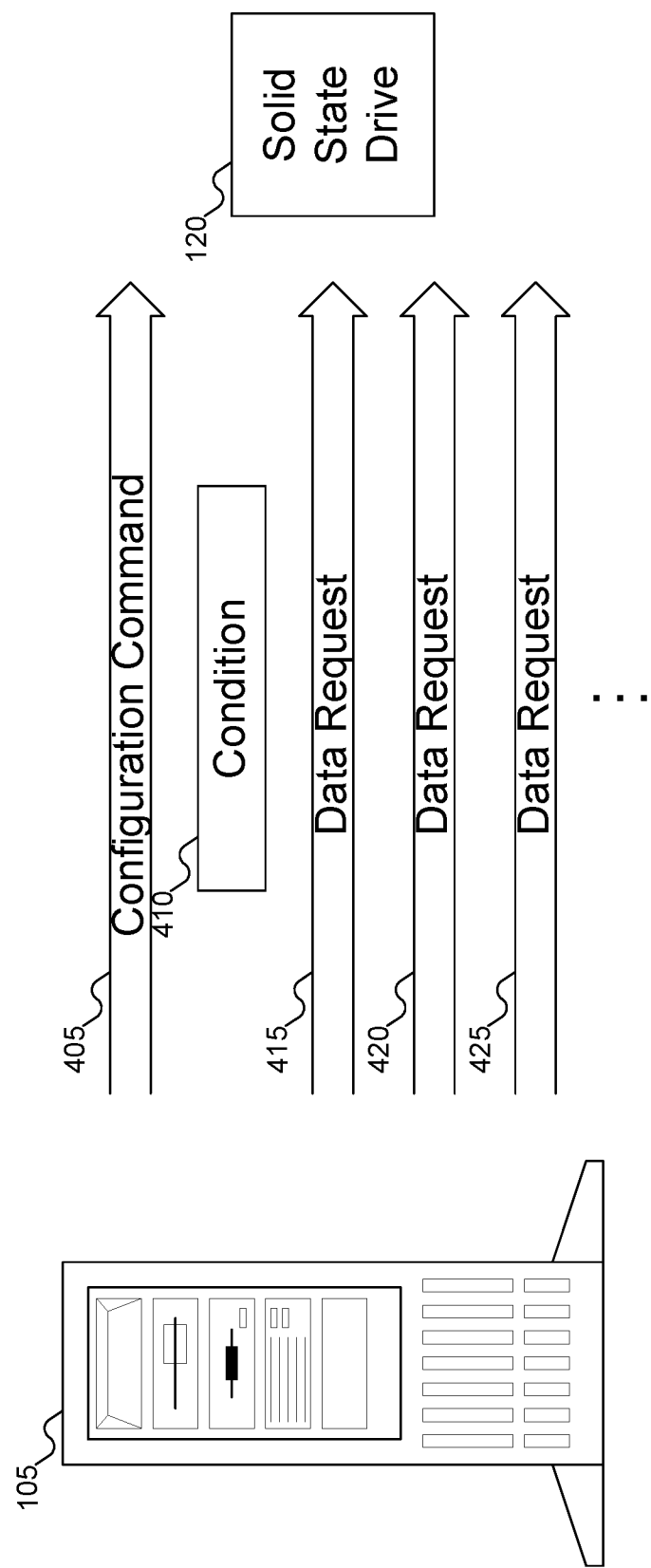
FIG. 4 shows the system of FIG. 1 sending a configuration command, followed by data requests, to the SSD of FIG. 1.

FIG. 4 shows host 105 of FIG. 1 sending a configuration command, followed by data requests, to SSD 120 of FIG. 1. In FIG. 4, host 105 may send configuration command 405 to SSD 120. Configuration command 405 may include condition 410, which may be either a singular condition or a compound condition. Once passive Garbage Collection is configured using configuration command 405, host 105 may send data requests 415, 420, and 425. While FIG. 4 shows host 105 sending three data requests 415, 420, and 425, embodiments of the inventive concept may support any number of data requests.

In addition, host 105 may send multiple configuration commands 405. For example, host 105 might send the first configuration command specifying condition 410 as a queue depth of 10 commands. But based on the response time for SSD 120, host 105 might decide to change condition 410 to an idle duration of 50 ms. Host 105 may send as many configuration commands 405 as desired; typically, the most recent configuration command will override any prior configuration commands.

Figure 5:
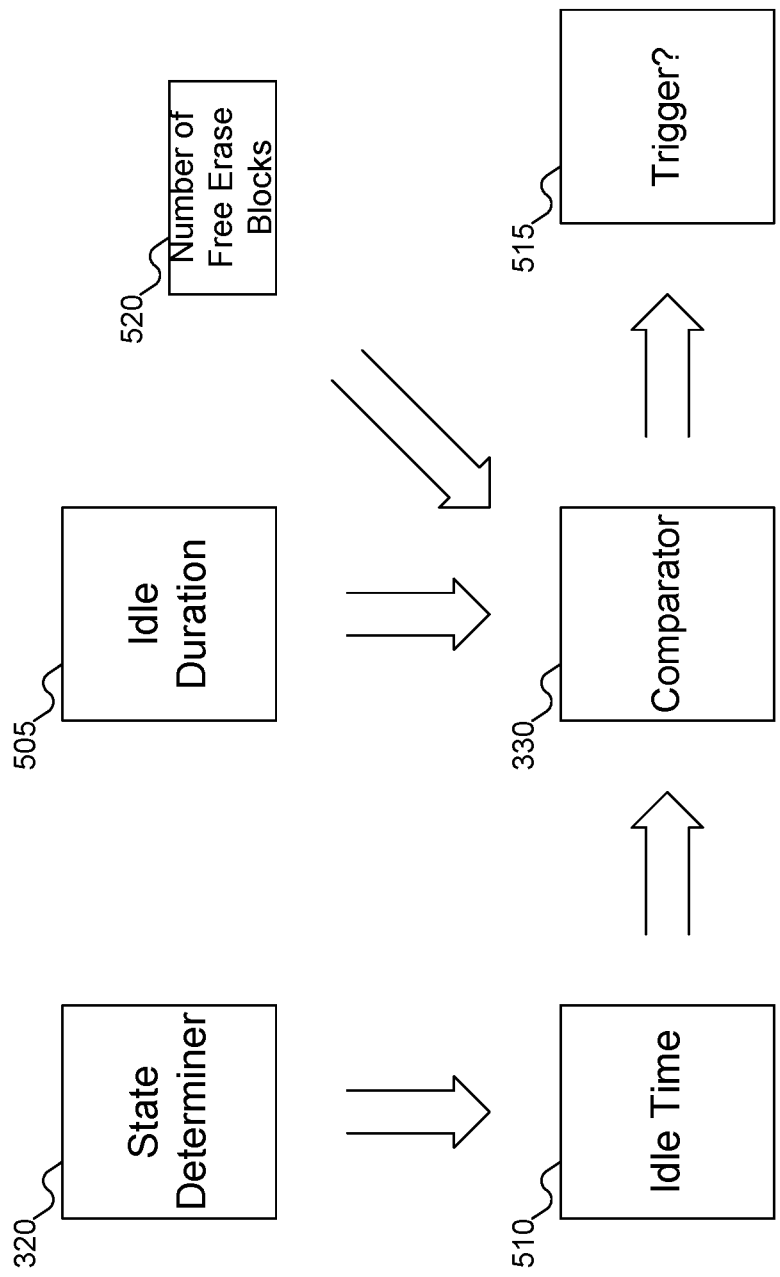
FIG. 5 shows the comparator of FIG. 3 being used to determine whether to perform passive Garbage Collection based on how long the SSD of FIG. 1 has been idle, according to an embodiment of the inventive concept.

FIG. 5 shows comparator 330 of FIG. 3 being used to determine whether to perform passive Garbage Collection based on how long SSD 120 of FIG. 1 has been idle, according to an embodiment of the inventive concept. In FIG. 5, condition 505 is set to an idle duration: for example, 50 ms. State determiner 320 may track how long SSD 120 of FIG. 1 has been idle. For example, state determiner 320 may start a timer when SSD 120 becomes idle, and may send periodic state information, shown as state 510, to comparator 330. Comparator 330 may then compare state 510 with condition 505. When condition 505 is met based on state 510, comparator 330 may indicate a successful comparison using trigger 515, which may be sent to trigger circuitry 335 of FIG. 3.

FIG. 5 also shows comparator 330 receiving number of free erase blocks 520. As described above, number of free erase blocks 520 may be determined by state determiner 320 as well, in a situation where host 105 of FIG. 1 specifies a compound condition. But if condition 410 of FIG. 1 only considers the idle time of SSD 120 of FIG. 1, then number of free erase block 520 may be omitted from FIG. 5.

Figure 6:
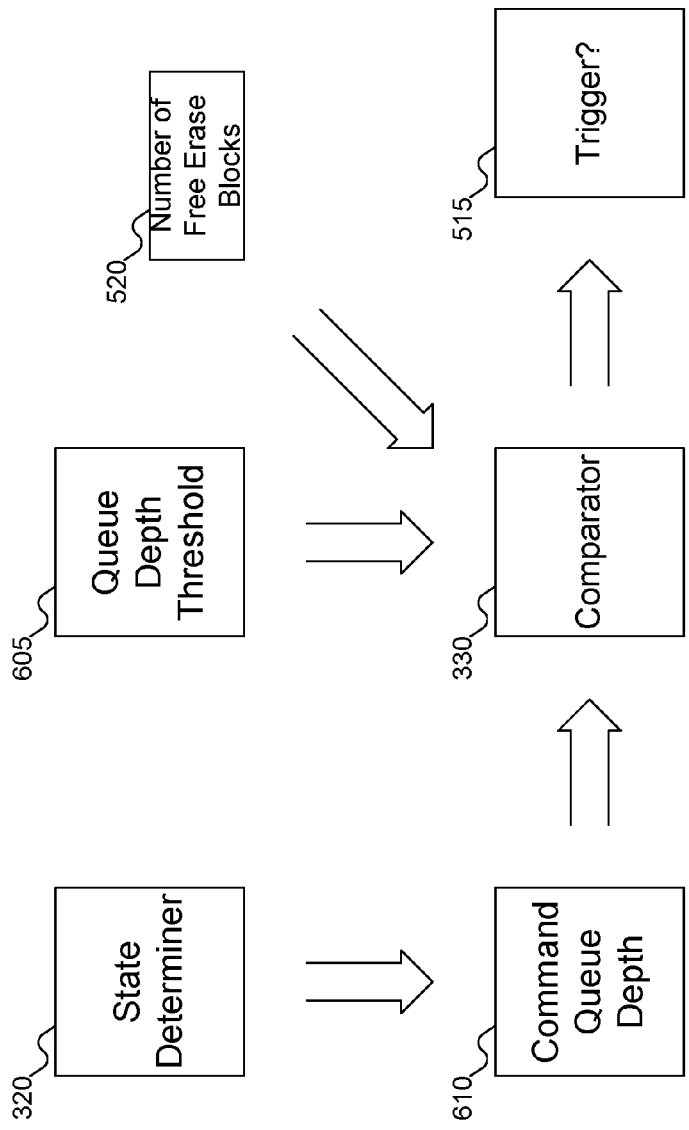
FIG. 6 shows the comparator of FIG. 3 being used to determine whether to perform passive Garbage Collection based on the queue depth of the SSD of FIG. 1, according to another embodiment of the inventive concept.

FIG. 6 shows comparator 330 of FIG. 3 being used to determine whether to perform passive Garbage Collection based on the queue depth of SSD 120 of FIG. 1, according to another embodiment of the inventive concept. FIG. 6 is similar to FIG. 5, except that instead of using idle time as condition 410 of FIG. 4, FIG. 6 uses queue depth as condition 410 of FIG. 4. Accordingly, condition 605 shows the queue depth threshold considered by comparator 330. Comparator 330 may also consider state 610 as the depth of the command queue, as determined by state determiner 320. As a result of the comparison, comparator 330 may produce trigger 515, if condition 605 is met.

As with FIG. 5, FIG. 6 shows comparator 330 also receiving number of free erase blocks 520. If condition 410 includes a threshold number of free erase blocks, state determiner 320 may determine number of free erase blocks 520, which comparator 330 may compare with the threshold number of free erase blocks. If condition 410 of FIG. 4 does not include a threshold number of free erase blocks, then number of free erase blocks 520 may be omitted from FIG. 6.

Figure 7:
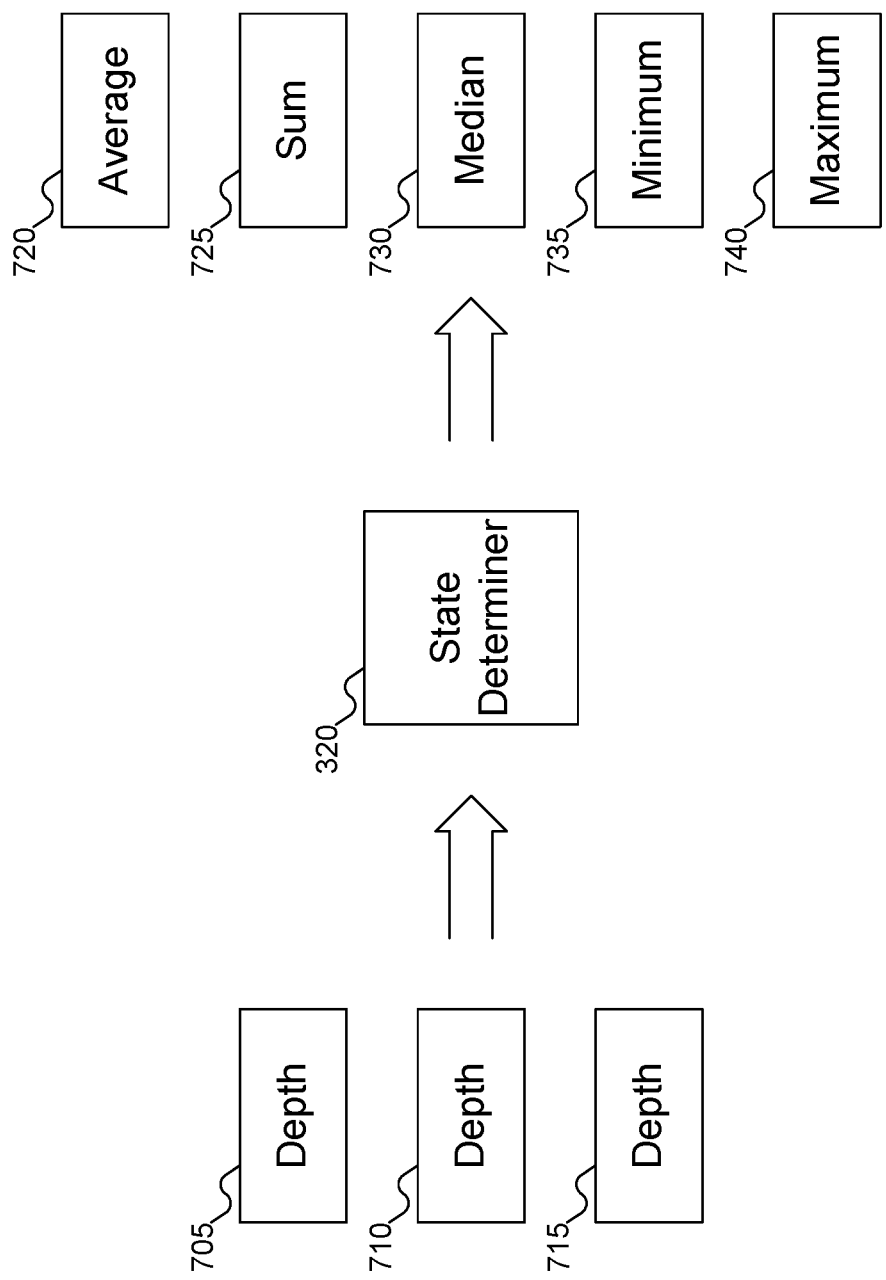
FIG. 7 shows the state determiner of FIG. 3 determining the queue depth of the SSD of FIG. 1 when the SSD of FIG. 1 includes multiple command queues.

FIG. 7 shows state determiner 320 of FIG. 3 determining the queue depth of SSD 120 of FIG. 1 when SSD 120 of FIG. 1 includes multiple command queues. In FIG. 7, state determiner 320 may receive depths 705, 710, and 715, which may represent the depths of three command queues in SSD 120 of FIG. 1. While FIG. 7 shows three depths 705, 710, and 715, embodiments off the inventive concept may support any number of depths, for any number of command queues.

Given depths 705, 710, and 715, state determiner 320 may calculate any desired statistic as command queue depth 610 of FIG. 6. Example statistics may include average 720 (also called the arithmetic mean), sum 725, median 730, minimum 735, and maximum 740, but other embodiments of the inventive concept may compute other statistics. Average 720 may be computed as the sum of all depths 705, 710, and 715, divided by the number of depths 705, 710, and 715. Sum 725 may be computed simply as the sum of all depths 705, 710, and 715 (sum 725 may represent the total number of pending commands across all queues). Median 730 may represent the size of the queue in the middle, if all the queue sizes were ordered numerically. Minimum 735 may represent the size of the queue with the smallest number of pending commands. And maximum 740 may represent the size of the queue with the largest number of pending commands.

Figure 8A:
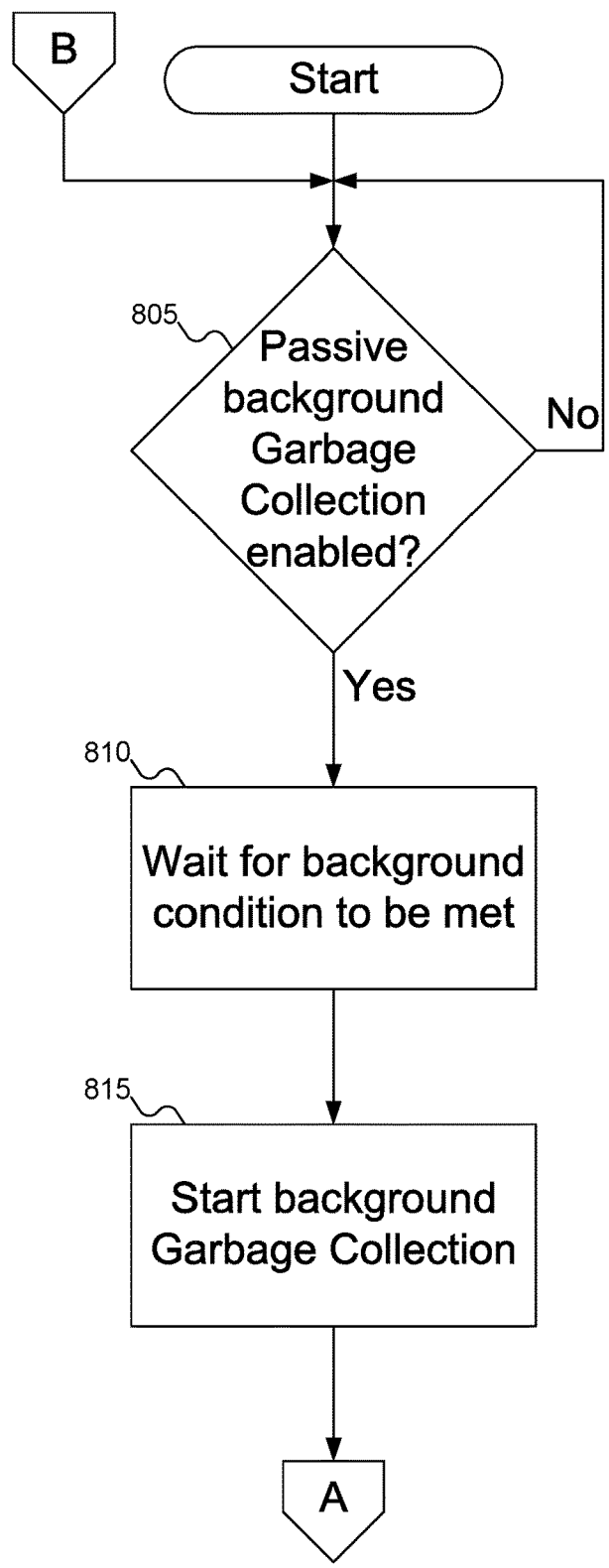
FIGS. 8A-8B show a flowchart of a procedure for managing background Garbage Collection on the SSD of FIG. 1, according to an embodiment of the inventive concept.
Figure 8B:
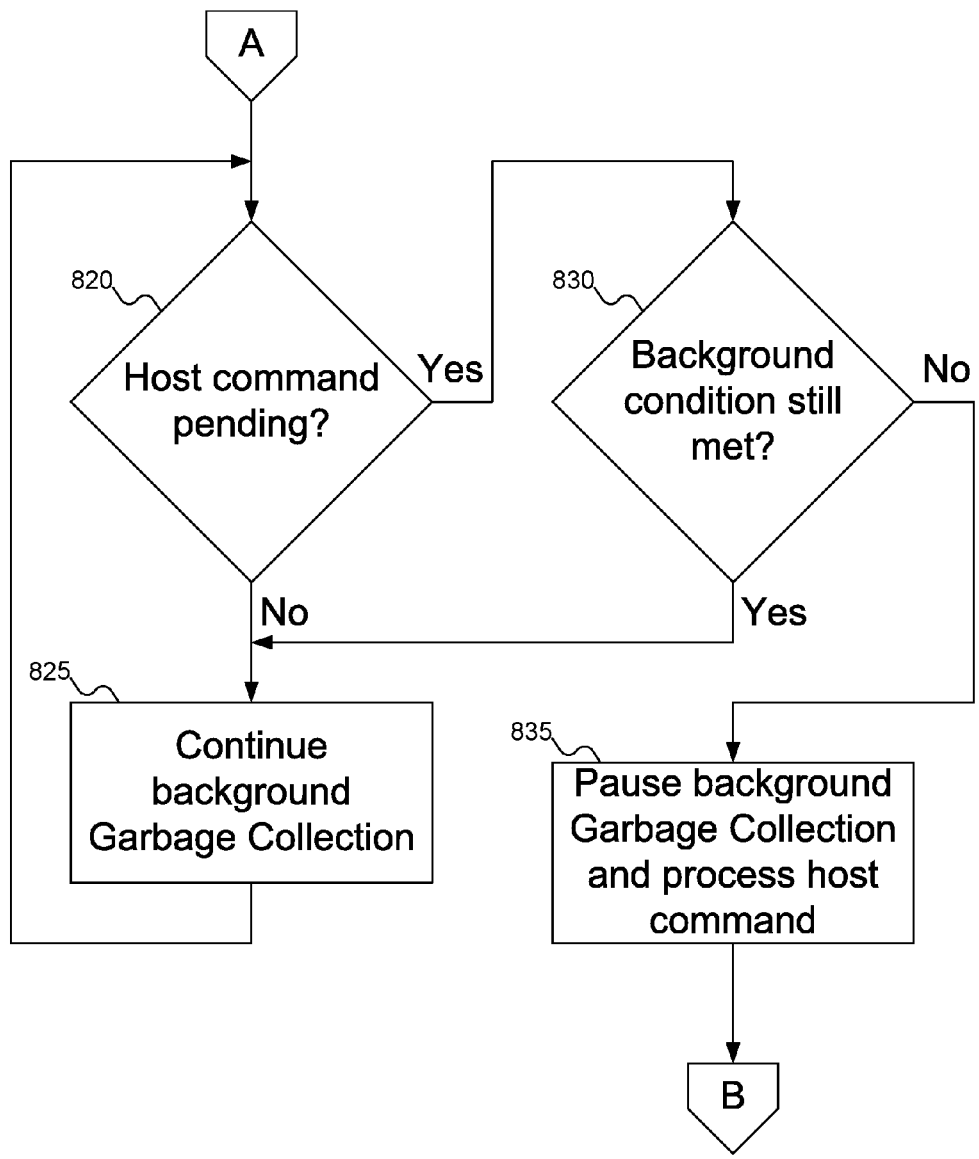

FIGS. 8A-8B show a flowchart of a procedure for managing background Garbage Collection on SSD 120 of FIG. 1, according to an embodiment of the inventive concept. In FIG. 8A, at block 805, SSD controller 310 of FIG. 3 may determine if SSD 120 of FIG. 1 is set up to perform background Garbage Collection. If so, then at block 810, SSD controller 310 of FIG. 3 (via state determiner 320, comparator 325, and condition storage 330, all of FIG. 3) may wait until condition 410 of FIG. 4 is met. Once condition 410 of FIG. 4 is met, at block 815, trigger circuitry 335 of FIG. 3 may trigger Garbage Collection logic 340 to begin background Garbage Collection.

At block 820 (FIG. 8B), SSD controller 310 of FIG. 3 may determine if a host command is pending completion while background Garbage Collection occurs. If no host command is pending completion, then at block 825 background Garbage Collection may continue. Otherwise, at block 830, SSD controller 310 of FIG. 3 (via state determiner 320, comparator 325, and condition storage 330, all of FIG. 3) may determine if condition 410 of FIG. 4 is still met. If so, then control may continue with block 825 to continue background Garbage Collection. Otherwise, at block 1305, background Garbage Collection may be paused to permit processing of the pending host command.

Figure 9:
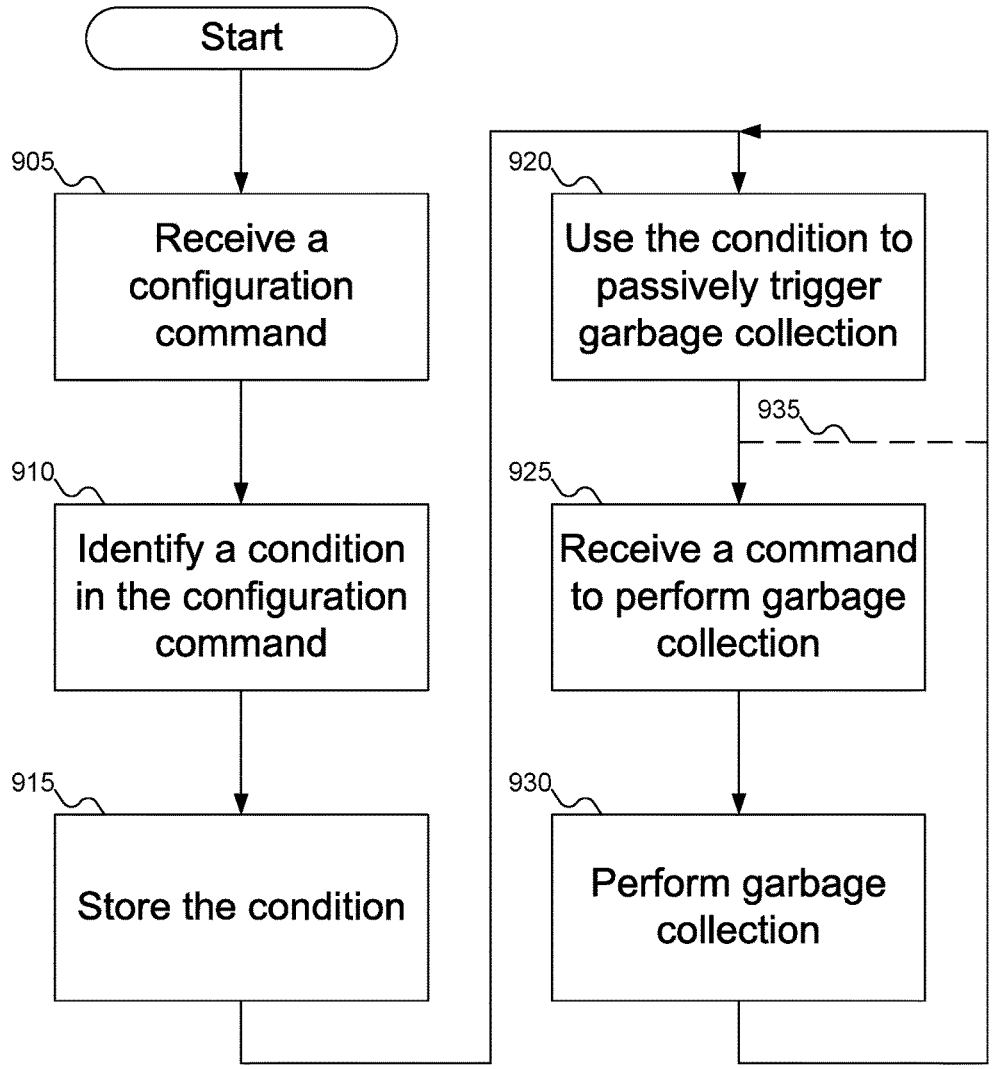
FIG. 9 shows a flowchart of an example procedure for how the SSD of FIG. 1 may be configured to perform passive Garbage Collection, according to an embodiment of the inventive concept.

FIG. 9 shows a flowchart of an example procedure for how SSD 120 of FIG. 1 may be configured to perform passive Garbage Collection, according to an embodiment of the inventive concept. In FIG. 9, at block 905, reception circuitry 305 of FIG. 3 may receive configuration command 405 of FIG. 4. At block 910, SSD controller 310 of FIG. 3 may identify condition 410 of FIG. 4 in configuration command 405 of FIG. 4. At block 915, condition storage 330 may store condition 410 of FIG. 4. At block 920, SSD controller 310 of FIG. 3 may use condition 410 of FIG. 4 to determine whether to passively trigger Garbage Collection. Examples of how block 920 may be implemented are shown in FIGS. 10-11 below.

At block 925, reception circuitry 305 of FIG. 3 may receive a command from host 105 of FIG. 1 to perform Garbage Collection. This command may be for a host-initiated Garbage Collection. At block 930, Garbage Collection logic 340 of FIG. 3 may perform the host-initiated Garbage Collection. Processing may then return to block 920. Note that host-initiated Garbage Collection is optional and may be omitted, as shown by dashed arrow 935.

Figure 10:
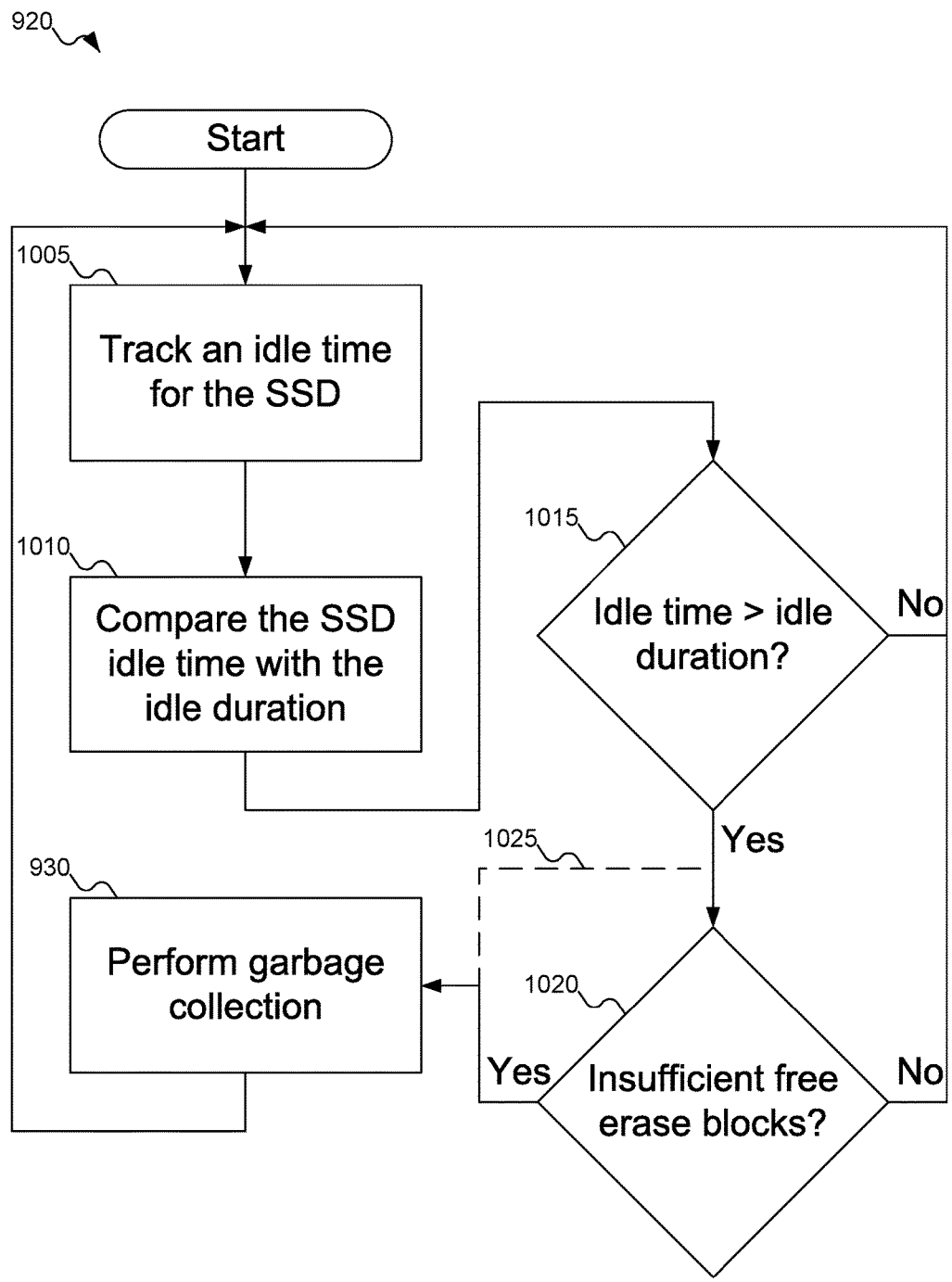
FIG. 10 shows a flowchart of an example procedure for the SSD of FIG. 1 to use the idle time, and optionally the free block count, of the SSD of FIG. 1 to determine when to perform passive Garbage Collection, according to an embodiment of the inventive concept.
Figure 11:
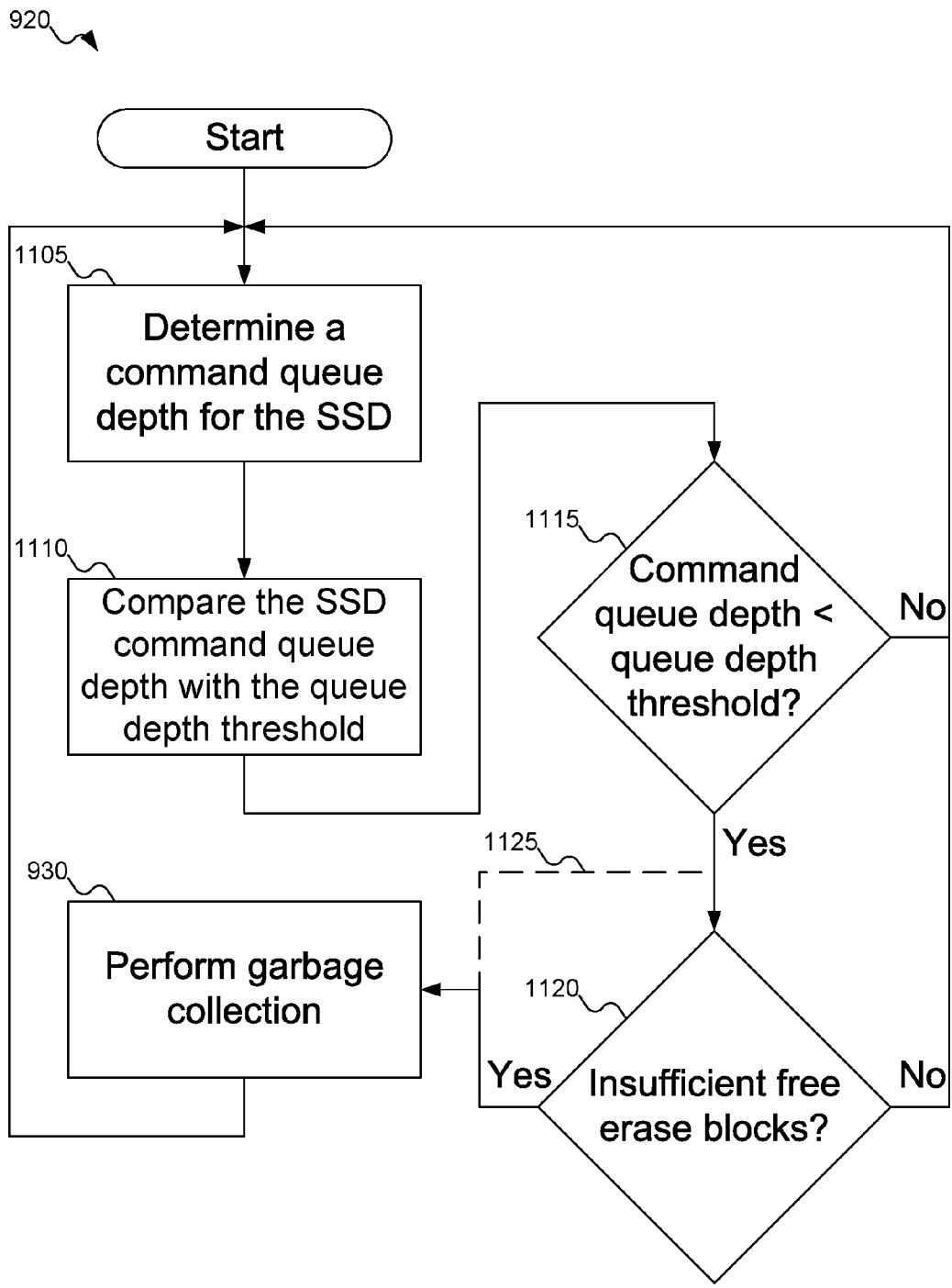
FIG. 11 shows a flowchart of an example procedure for the SSD of FIG. 1 to use the queue depth, and optionally the free block count, of the SSD of FIG. 1 to determine when to perform passive Garbage Collection, according to an embodiment of the inventive concept.

FIG. 10 shows a flowchart of an example procedure for SSD 120 of FIG. 1 to use idle time 505 of FIG. 5, and optionally free block count 520 of FIG. 5, for SSD 120 of FIG. 1 to determine when to perform passive Garbage Collection, according to an embodiment of the inventive concept. In FIG. 10, at block 1005, state determiner 320 may track idle time 510 of FIG. 5 for SSD 120 of FIG. 1. At block 1010, comparator 330 of FIG. 3 may compare idle time 510 of FIG. 5 with idle duration 505 of FIG. 5. At block 1015, SSD controller 310 of FIG. 3 may determine if idle time 510 of FIG. 5 satisfies idle duration 505 of FIG. 5. If not, then control may return to block 1005.

If idle time 510 of FIG. 5 satisfies idle duration 505 of FIG. 5, then at block 1020 SSD controller 310 of FIG. 3 may determine if there are a sufficient number of free erase blocks in SSD 120 of FIG. 1. If there are a sufficient number of free erase blocks, then control may return to block 1005. Otherwise, control may proceed to block 930, where Garbage Collection logic 340 may perform Garbage Collection on flash memory 315 of FIG. 3. Note that in FIG. 10, block 930 is a passive Garbage Collection operation, rather than a host-initiated Garbage Collection operation; but to Garbage Collection logic 340 of FIG. 3 there is no difference. Block 1020 is optional, as shown by dashed arrow 1025, in which case the number of free erase blocks in SSD 120 of FIG. 1 is not part of condition 410 of FIG. 4.

FIG. 11 shows a flowchart of an example procedure for SSD 120 of FIG. 1 to use queue depth 605 of FIG. 6, and optionally free block count 520 of FIG. 6, for SSD 120 of FIG. 1 to determine when to perform passive Garbage Collection, according to an embodiment of the inventive concept. In FIG. 11, at block 1105, state determiner 320 may track queue depth 605 of FIG. 6 for SSD 120 of FIG. 1. At block 1110, comparator 330 of FIG. 3 may compare queue depth 605 of FIG. 6 with queue depth threshold 610 of FIG. 6. At block 1115, SSD controller 310 of FIG. 3 may determine if queue depth 605 of FIG. 6 satisfies queue depth threshold 610 of FIG. 6. If not, then control may return to block 1105.

If queue depth 605 of FIG. 6 satisfies queue depth threshold 610 of FIG. 6, then at block 1120 SSD controller 310 of FIG. 3 may determine if there are sufficient number of free erase blocks in SSD 120 of FIG. 1. If there are sufficient number of free erase blocks, then control may return to block 1105. Otherwise, control may proceed to block 930, where Garbage Collection logic 340 may perform Garbage Collection on flash memory 315 of FIG. 3. Note that in FIG. 11, block 930 is a passive Garbage Collection operation, rather than a host-initiated Garbage Collection operation; but to Garbage Collection logic 340 of FIG. 3 there is no difference. Block 1120 is optional, as shown by dashed arrow 1125, in which case the number of free erase blocks in SSD 120 of FIG. 1 is not part of condition 410 of FIG. 4.

Figure 12:
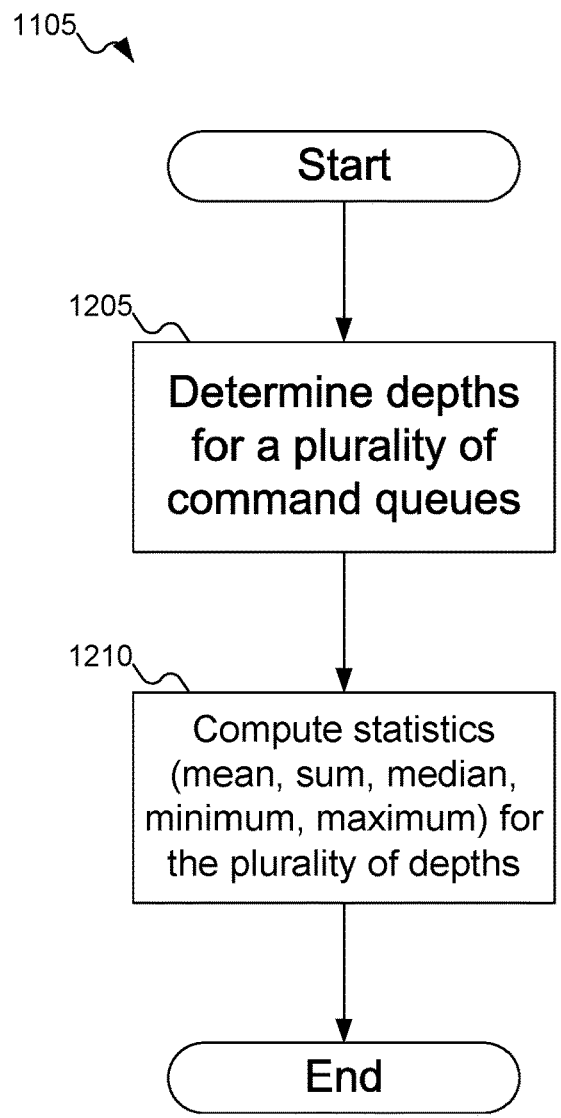
FIG. 12 shows a flowchart of an example procedure for the state determiner of FIG. 3 to determine the queue depth of the SSD of FIG. 1 when the SSD of FIG. 1 includes multiple command queues, according to an embodiment of the inventive concept.

FIG. 12 shows a flowchart of an example procedure for state determiner 320 of FIG. 3 to determine queue depth 610 of FIG. 6 for the SSD of FIG. 1 when the SSD of FIG. 1 includes multiple command queues, according to an embodiment of the inventive concept. At block 1205, state determiner 320 of FIG. 3 may determine the depths 705, 710, and 715 of FIG. 7 for each of the plurality of queues. At block 1210, state determiner 320 of FIG. 3 may calculate a statistic, such as average 720, sum 725, minimum 735, or maximum 740, all of FIG. 7, from the depths 705, 710, and 715 of FIG. 7 for the plurality of queues. State determiner 320 may then use this calculated statistics as queue depth 610 of FIG. 6.

In FIGS. 8A-12, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD) (120), comprising:
  storage (315) for data;
  Garbage Collection logic (340) to perform Garbage Collection on the storage (315);
  reception circuitry (305) to receive a configuration command (405) and data requests (420, 415, 425), the configuration command (405) including a condition (410, 505, 605) drawn from a set including an idle duration (505) and a queue depth threshold (605);
  condition storage (325) to store the condition (410, 505, 605);
  a state determiner (320) to determine a state (510, 610) of the SSD (120); and
  a comparator (330) to compare the state (510, 610) of the SSD (120) with the condition (410, 505, 605).

Statement 2. An embodiment of the inventive concept includes an SSD (120) according to statement 1, further comprising trigger circuitry (335) to trigger the Garbage Collection logic (340) to perform Garbage Collection on the storage (315) if the comparator (330) indicates that the state (510, 610) of the SSD (120) satisfies the condition (410, 505, 605).

Statement 3. An embodiment of the inventive concept includes an SSD (120) according to statement 1, wherein the condition (410, 505, 605) includes a compound condition.

Statement 4. An embodiment of the inventive concept includes an SSD (120) according to statement 1, wherein the trigger circuitry (335) is operative to trigger the Garbage Collection logic (340) to perform Garbage Collection on the storage (315) if the comparator (330) indicates that the state (510, 610) of the SSD (120) satisfies the condition (410, 505, 605) and a number of free erase blocks (520) on the SSD (120) is below a threshold.

Statement 5. An embodiment of the inventive concept includes an SSD (120) according to statement 1, wherein the reception circuitry (305) is operative to receive the configuration command (405) from a host (105).

Statement 6. An embodiment of the inventive concept includes an SSD (120) according to statement 1, wherein:
  the condition (410, 505, 605) includes the idle duration (505);
  the state determiner (320) is operative to determine an idle time (510) for the SSD (120); and
  the comparator (330) is operative to compare the idle time (510) for the SSD (120) with the idle duration (505).

Statement 7. An embodiment of the inventive concept includes an SSD (120) according to statement 1, wherein:
  the condition (410, 505, 605) includes the queue depth threshold (605);
  the state determiner (320) is operative to determine a command queue depth (610) for the SSD (120); and
  the comparator (330) is operative to compare the command queue depth (610) for the SSD (120) with the queue depth threshold (605).

Statement 8. An embodiment of the inventive concept includes an SSD (120) according to statement 7, wherein the state determiner (320) is operative to determine the command queue depth (610) for the SSD (120) from a plurality of depths (705, 710, 715).

Statement 9. An embodiment of the inventive concept includes an SSD (120) according to statement 8, wherein the state determiner (320) is operative to compute the command queue depth (610) as an average (720) of the plurality of depths (705, 710, 715).

Statement 10. An embodiment of the inventive concept includes an SSD (120) according to statement 8, wherein the state determiner (320) is operative to compute the command queue depth (610) as a sum (725) of the plurality of depths (705, 710, 715).

Statement 11. An embodiment of the inventive concept includes an SSD (120) according to statement 8, wherein the state determiner (320) is operative to compute the command queue depth (610) as a median (730) of the plurality of depths (705, 710, 715).

Statement 12. An embodiment of the inventive concept includes an SSD (120) according to statement 8, wherein the state determiner (320) is operative to compute the command queue depth (610) as a maximum (740) of the plurality of depths (705, 710, 715).

Statement 13. An embodiment of the inventive concept includes an SSD (120) according to statement 8, wherein the state determiner (320) is operative to compute the command queue depth (610) as a minimum (735) of the plurality of depths (705, 710, 715).

Statement 14. An embodiment of the inventive concept includes an SSD (120) according to statement 1, wherein the reception circuitry (305) is operative receive an instruction from a host (105) to perform Garbage Collection.

Statement 15. An embodiment of the inventive concept includes an SSD (120) according to statement 1, wherein the configuration command (405) includes a user-configurable configuration command (405).

Statement 16. An embodiment of the inventive concept includes a method, comprising:

receiving (905, 910), at a Solid State Drive (SSD) (120), a configuration command (405), the configuration command (405) including a condition (410, 505, 605) drawn from a set including an idle duration (505) and a queue depth threshold (605);

storing (3815) the condition (410, 505, 605) on the SSD (120); and using (920) the condition (410, 505, 605) to perform Garbage Collection on the SSD (120).

Statement 17. An embodiment of the inventive concept includes a method according to statement 16, wherein receiving (905, 910), at an SSD (120), a configuration command (405) includes receiving (905, 910), at the SSD (120), the configuration command (405) from a host (105).

Statement 18. An embodiment of the inventive concept includes a method according to statement 16, wherein using (920) the condition (410, 505, 605) to perform Garbage Collection on the SSD (120) includes:

monitoring (1005, 1105) a state (510, 610) of the SSD (120);

comparing (1010, 1110) the state (510, 610) of the SSD (120) with the condition (410, 505, 605); and performing (930) Garbage Collection on the SSD (120) if the state (510, 610) of the SSD (120) satisfies the condition (410, 505, 605).

Statement 19. An embodiment of the inventive concept includes a method according to statement 18, wherein;

receiving (905, 910), at an SSD (120), a configuration command (405) includes receiving (905, 910), at the SSD (120), the configuration command (405), the configuration command (405) including the idle duration (505);

monitoring (1005, 1105) a state (510, 610) of the SSD (120) includes tracking (1005) an idle time (510) for the SSD (120); and comparing (1010, 1110) the state (510, 610) of the SSD (120) with the condition (410, 505, 605) includes comparing (1010) the idle time (510) for the SSD (120) with the idle duration (505).

Statement 20. An embodiment of the inventive concept includes a method according to statement 18, wherein;

receiving (905, 910), at an SSD (120), a configuration command (405) includes receiving (905, 910), at the SSD (120), the configuration command (405), the configuration command (405) including the queue depth threshold (605);

monitoring (1005, 1105) a state (510, 610) of the SSD (120) includes determining (1105) a command queue depth (610) for the SSD (120); and comparing (1010, 1110) the state (510, 610) of the SSD (120) with the condition (410, 505, 605) includes comparing (1110) the queue depth threshold (605) with the command queue depth (610) for the SSD (120).

Statement 21. An embodiment of the inventive concept includes a method according to statement 20, wherein monitoring (1005, 1105) a state (510, 610) of the SSD (120) includes determining (1105) a command queue depth (610) for the SSD (120) includes:

determining (1205) a plurality of depths (705, 710, 715) for a plurality of command queues; and determining (1105) the command queue depth (610) from the plurality of depths (705, 710, 715).

Statement 22. An embodiment of the inventive concept includes a method according to statement 21, wherein determining (1105) the command queue depth (610) from the plurality of depths (705, 710, 715) includes computing (1210) the command queue depth (610) as an average (720) of all of the plurality of depths (705, 710, 715).

Statement 23. An embodiment of the inventive concept includes a method according to statement 21, wherein determining (1105) the command queue depth (610) from the plurality of depths (705, 710, 715) includes computing (1210) the command queue depth (610) as a sum (725) of all of the plurality of depths (705, 710, 715).

Statement 24. An embodiment of the inventive concept includes a method according to statement 21, wherein determining (1105) the command queue depth (610) from the plurality of depths (705, 710, 715) includes computing (1210) the command queue depth (610) as a median (730) of all the plurality of depths (705, 710, 715).

Statement 25. An embodiment of the inventive concept includes a method according to statement 21, wherein determining (1105) the command queue depth (610) from the plurality of depths (705, 710, 715) includes computing (1210) the command queue depth (610) as a maximum (740) of all the plurality of depths (705, 710, 715).

Statement 26. An embodiment of the inventive concept includes a method according to statement 21, wherein determining (1105) the command queue depth (610) from the plurality of depths (705, 710, 715) includes computing (1210) the command queue depth (610) as a minimum (735) of all the plurality of depths (705, 710, 715).

Statement 27. An embodiment of the inventive concept includes a method according to statement 16, wherein receiving (905, 910), at a Solid State Drive (SSD) (120), a configuration command (405) includes receiving (905, 910), at the SSD (120) the configuration command (405), the configuration command (405) including a compound condition.

Statement 28. An embodiment of the inventive concept includes a method according to statement 18, wherein performing (930) Garbage Collection on the SSD (120) if the state (510, 610) of the SSD (120) satisfies the condition (410, 505, 605) includes performing (930) Garbage Collection on the SSD (120) if the state (510, 610) of the SSD (120) satisfies the condition (410, 505, 605) and a number of free erase blocks (520) on the SSD (120) is below a threshold.

Statement 29. An embodiment of the inventive concept includes a method according to statement 16, further comprising receiving (925) an instruction from a host (105) to perform Garbage Collection.

Statement 30. An embodiment of the inventive concept includes a method according to statement 16, wherein receiving (905, 910), at an SSD (120), a configuration command (405), includes receiving (905, 910), at the SSD (120), a user-configurable configuration command (405), the user-configurable configuration command (405) including the condition (410, 505, 605) drawn from the set including the idle duration (505) and the queue depth threshold (605).

Statement 31. An embodiment of the inventive concept includes an article, comprising a tangible storage medium, said tangible storage medium having stored thereon non-transitory instructions that, when executed by a machine (105), result in:

receiving (905, 910), at a Solid State Drive (SSD) (120), a configuration command (405), the configuration command (405) including a condition (410, 505, 605) drawn from a set including an idle duration (505) and a queue depth threshold (605);

storing (3815) the condition (410, 505, 605) on the SSD (120); and using (920) the condition (410, 505, 605) to perform Garbage Collection on the SSD (120).

Statement 32. An embodiment of the inventive concept includes an article according to statement 31, wherein receiving (905, 910), at an SSD (120), a configuration command (405) includes receiving (905, 910), at the SSD (120), the configuration command (405) from a host (105).

Statement 33. An embodiment of the inventive concept includes an article according to statement 31, wherein using (920) the condition (410, 505, 605) to perform Garbage Collection on the SSD (120) includes:

monitoring (1005, 1105) a state (510, 610) of the SSD (120);

comparing (1010, 1110) the state (510, 610) of the SSD (120) with the condition (410, 505, 605); and performing (930) Garbage Collection on the SSD (120) if the state (510, 610) of the SSD (120) satisfies the condition (410, 505, 605).

Statement 34. An embodiment of the inventive concept includes an article according to statement 33, wherein;

receiving (905, 910), at an SSD (120), a configuration command (405) includes receiving (905, 910), at the SSD (120), the configuration command (405), the configuration command (405) including the idle duration (505);

monitoring (1005, 1105) a state (510, 610) of the SSD (120) includes tracking (1005) an idle time (510) for the SSD (120); and comparing (1010, 1110) the state (510, 610) of the SSD (120) with the condition (410, 505, 605) includes comparing (1010) the idle time (510) for the SSD (120) with the idle duration (505).

Statement 35. An embodiment of the inventive concept includes an article according to statement 33, wherein;

receiving (905, 910), at an SSD (120), a configuration command (405) includes receiving (905, 910), at the SSD (120), the configuration command (405), the configuration command (405) including the queue depth threshold (605);

monitoring (1005, 1105) a state (510, 610) of the SSD (120) includes determining (1105) a command queue depth (610) for the SSD (120); and comparing (1010, 1110) the state (510, 610) of the SSD (120) with the condition (410, 505, 605) includes comparing (1110) the queue depth threshold (605) with the command queue depth (610) for the SSD (120).

Statement 36. An embodiment of the inventive concept includes an article according to statement 35, wherein monitoring (1005, 1105) a state (510, 610) of the SSD (120) includes determining (1105) a command queue depth (610) for the SSD (120) includes:

determining (1205) a plurality of depths (705, 710, 715) for a plurality of command queues; and determining (1105) the command queue depth (610) from the plurality of depths (705, 710, 715).

Statement 37. An embodiment of the inventive concept includes an article according to statement 36, wherein determining (1105) the command queue depth (610) from the plurality of depths (705, 710, 715) includes computing (1210) the command queue depth (610) as an average (720) of all of the plurality of depths (705, 710, 715).

Statement 38. An embodiment of the inventive concept includes an article according to statement 36, wherein determining (1105) the command queue depth (610) from the plurality of depths (705, 710, 715) includes computing (1210) the command queue depth (610) as a sum (725) of all of the plurality of depths (705, 710, 715).

Statement 39. An embodiment of the inventive concept includes an article according to statement 36, wherein determining (1105) the command queue depth (610) from the plurality of depths (705, 710, 715) includes computing (1210) the command queue depth (610) as a median (730) of all the plurality of depths (705, 710, 715).

Statement 40. An embodiment of the inventive concept includes an article according to statement 36, wherein determining (1105) the command queue depth (610) from the plurality of depths (705, 710, 715) includes computing (1210) the command queue depth (610) as a maximum (740) of all the plurality of depths (705, 710, 715).

Statement 41. An embodiment of the inventive concept includes an article according to statement 36, wherein determining (1105) the command queue depth (610) from the plurality of depths (705, 710, 715) includes computing (1210) the command queue depth (610) as a minimum (735) of all the plurality of depths (705, 710, 715).

Statement 42. An embodiment of the inventive concept includes an article according to statement 31, wherein receiving (905, 910), at a Solid State Drive (SSD) (120), a configuration command (405) includes receiving (905, 910), at the SSD (120) the configuration command (405), the configuration command (405) including a compound condition.

Statement 43. An embodiment of the inventive concept includes an article according to statement 33, wherein performing (930) Garbage Collection on the SSD (120) if the state (510, 610) of the SSD (120) satisfies the condition (410, 505, 605) includes performing (930) Garbage Collection on the SSD (120) if the state (510, 610) of the SSD (120) satisfies the condition (410, 505, 605) and a number of free erase blocks (520) on the SSD (120) is below a threshold.

Statement 44. An embodiment of the inventive concept includes an article according to statement 31, wherein said tangible storage medium has stored thereon further non-transitory instructions that, when executed by the machine (105), result in receiving (925) an instruction from a host (105) to perform Garbage Collection.

Statement 45. An embodiment of the inventive concept includes an article according to statement 31, wherein receiving (905, 910), at an SSD (120), a configuration command (405), includes receiving (905, 910), at the SSD (120), a user-configurable configuration command (405), the user-configurable configuration command (405) including the condition (410, 505, 605) drawn from the set including the idle duration (505) and the queue depth threshold (605).

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Solid State Drive (SSD), comprising:
   storage for data;
   Garbage Collection logic to perform Garbage Collection on the storage;
   reception circuitry to receive a configuration command and data requests, the configuration command including a condition drawn from a set including an idle duration and a queue depth threshold;
   condition storage to store the condition;
   a state determiner to determine a state of the SSD;
   a comparator to compare the state of the SSD with the condition; and trigger circuitry to trigger the Garbage Collection logic to perform Garbage Collection on the storage based at least in part on the comparator indicating that the state of the SSD satisfies the condition, wherein the trigger circuitry operates to schedule Garbage Collection on the storage at a time that improves Input/Output (I/O) requests at the SSD.

2. An SSD according to claim 1, wherein:
the condition includes the idle duration;
the state determiner is operative to determine an idle time for the SSD; and
the comparator is operative to compare the idle time for the SSD with the idle duration.

3. An SSD according to claim 1, wherein:
the condition includes the queue depth threshold;
the state determiner is operative to determine a command queue depth for the SSD; and
the comparator is operative to compare the command queue depth for the SSD with the queue depth threshold.

4. An SSD according to claim 1, wherein:
the configuration command is received from a host computer;
the condition includes both the idle duration and the queue depth threshold, the idle duration greater than 0 units of time;
the state determiner is operative to determine an idle time for the SSD and a command queue depth for the SSD; and
the comparator is operative to compare the idle time for the SSD with the idle duration and the command queue depth for the SSD with the queue depth threshold.

5. An SSD according to claim 4, wherein the trigger circuitry is operative to trigger the Garbage Collection logic to perform Garbage Collection on the storage based at least in part on the comparator indicating that the state of the SSD satisfies the condition and a number of free erase blocks on the SSD is below a threshold.

6. An SSD according to claim 4, wherein the state determiner is operative to determine the command queue depth for the SSD from a plurality of depths.

7. An SSD according to claim 6, wherein the state determiner is operative to compute the command queue depth as an average of the plurality of depths.

8. An SSD according to claim 6, wherein the state determiner is operative to compute the command queue depth as a maximum of the plurality of depths.

9. An SSD according to claim 6, wherein the state determiner is operative to compute the command queue depth as a sum of the plurality of depths.

10. An SSD according to claim 6, wherein the state determiner is operative to compute the command queue depth as a median of the plurality of depths.

11. An SSD according to claim 6, wherein the state determiner is operative to compute the command queue depth as a minimum of the plurality of depths.

12. An SSD according to claim 1, further comprising a processor to identify the configuration command received by the reception circuitry, store the condition in the condition storage, and configure the state determiner to determine an appropriate state of the SSD responsive to the condition.

13. A method, comprising:
receiving, at a Solid State Drive (SSD), a configuration command, the configuration command including a condition drawn from a set including an idle duration and a queue depth threshold;
storing the condition on the SSD; and
performing Garbage Collection on the SSD based on the condition, wherein performing Garbage Collection on the SSD based on the condition operates to schedule Garbage Collection on the SSD at a time that improves Input/Output (I/O) requests at the SSD.

14. A method according to claim 13, wherein using the condition to perform Garbage Collection on the SSD includes:
monitoring a state of the SSD;
comparing the state of the SSD with the condition; and
performing the Garbage Collection on the SSD based at least in part on the state of the SSD satisfying the condition.

15. A method according to claim 14, wherein;
receiving, at an SSD, a configuration command includes receiving, at the SSD, the configuration command, the configuration command including the idle duration;
monitoring a state of the SSD includes tracking an idle time for the SSD; and
comparing the state of the SSD with the condition includes comparing the idle time for the SSD with the idle duration.

16. A method according to claim 14, wherein;
receiving, at an SSD, a configuration command includes receiving, at the SSD, the configuration command, the configuration command including the queue depth threshold;
monitoring a state of the SSD includes determining a command queue depth for the SSD; and
comparing the state of the SSD with the condition includes comparing the queue depth threshold with the command queue depth for the SSD.

17. A method according to claim 14, wherein:
receiving, at a Solid State Drive (SSD), a configuration command, the configuration command including a condition drawn from a set including an idle duration and a queue depth threshold includes receiving, at the SSD, from a host computer, the configuration command, the configuration command including a condition including an idle duration and a queue depth threshold, the idle duration greater than 0 units of time;
monitoring a state of the SSD includes:
tracking an idle time for the SSD; and
determining a command queue depth for the SSD; and
comparing the state of the SSD with the condition includes:
comparing the idle time for the SSD with the idle duration; and
comparing the queue depth threshold with the command queue depth for the SSD.

18. A method according to claim 17 wherein monitoring a state of the SSD includes determining a command queue depth for the SSD includes:
determining a plurality of depths for a plurality of command queues; and
determining the command queue depth from the plurality of depths.

19. A method according to claim 18, wherein determining the command queue depth from the plurality of depths includes computing the command queue depth as an average of all of the plurality of depths.

20. A method according to claim 18, wherein determining the command queue depth from the plurality of depths includes computing the command queue depth as a maximum of all the plurality of depths.

21. A method according to claim 18, wherein determining the command queue depth from the plurality of depths includes computing the command queue depth as a sum of all of the plurality of depths.

22. A method according to claim 18, wherein determining the command queue depth from the plurality of depths includes computing the command queue depth as a median of all the plurality of depths.

23. A method according to claim 18, wherein determining the command queue depth from the plurality of depths includes computing the command queue depth as a minimum of all the plurality of depths.

24. A method according to claim 17, wherein performing Garbage Collection on the SSD based at least in part on the state of the SSD condition satisfying the condition includes performing Garbage Collection on the SSD based at least in part on the state of the SSD condition satisfying the condition and a number of free erase blocks on the SSD is below a threshold.

25. A method according to claim 13, further comprising receiving an instruction from a host computer to perform Garbage Collection.

26. An article, comprising a tangible storage medium, said tangible, non-transitory storage medium having stored thereon instructions that, when executed by a machine, result in:
  receiving, at a Solid State Drive (SSD), a configuration command, the configuration command including a condition drawn from a set including an idle duration and a queue depth threshold;
  storing the condition on the SSD; and
  performing Garbage Collection on the SSD based on the condition,
  wherein performing Garbage Collection on the SSD based on the condition operates to schedule Garbage Collection on the SSD at a time that improves Input/Output (I/O) requests at the SSD.

27. An article according to claim 26, wherein using the condition to perform Garbage Collection on the SSD includes:
  monitoring a state of the SSD;
  comparing the state of the SSD with the condition; and
  performing the Garbage Collection on the SSD based at least in part on the state of the SSD condition satisfying the condition.

28. An article according to claim 27, wherein:
  receiving, at a Solid State Drive (SSD), a configuration command, the configuration command including a condition drawn from a set including an idle duration and a queue depth threshold includes receiving, at the SSD, from a host computer, the configuration command, the configuration command including a condition including an idle duration and a queue depth threshold, the idle duration greater than 0 units of time;
  monitoring a state of the SSD includes:
    tracking an idle time for the SSD; and
    determining a command queue depth for the SSD; and
  comparing the state of the SSD with the condition includes:
    comparing the idle time for the SSD with the idle duration; and
    comparing the queue depth threshold with the command queue depth for the SSD.

29. An article according to claim 28, wherein performing Garbage Collection on the SSD based at least in part on the state of the SSD condition satisfying the condition includes performing Garbage Collection on the SSD based at least in part on the state of the SSD condition satisfying the condition and a number of free erase blocks on the SSD is below a threshold.

* * * * *